Sept. 24, 1963
W. E. MILLER
3,104,847
FILM SUPPLY MAGAZINE
Filed Feb. 23, 1962
3 Sheets-Sheet 2
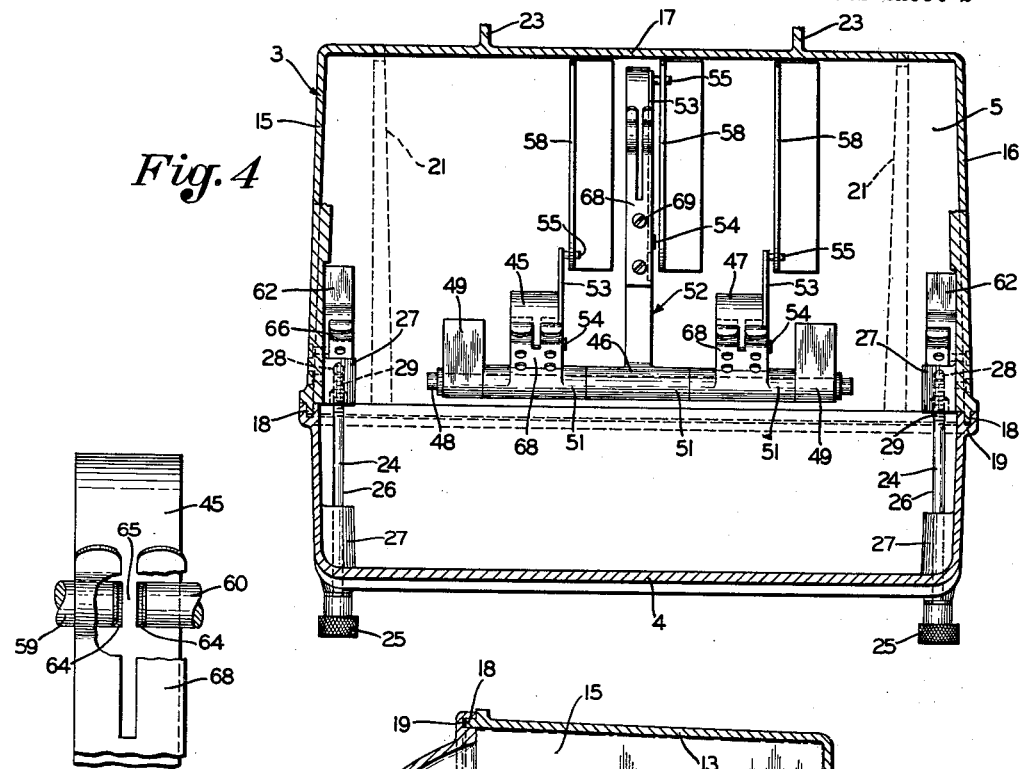
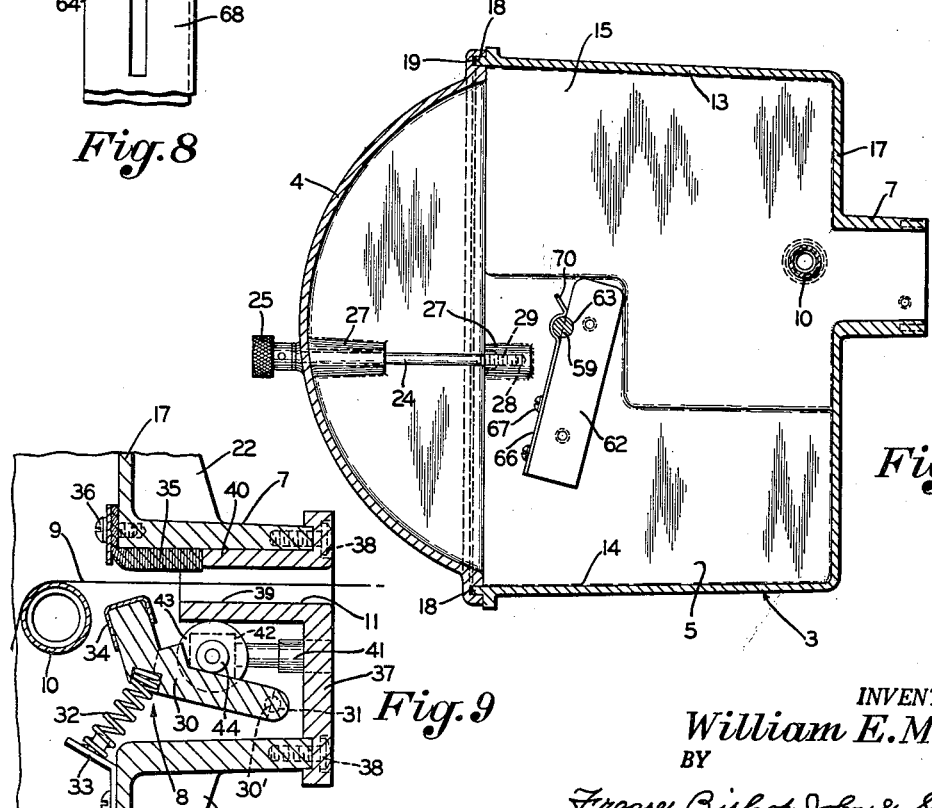
INVENTOR.
William E. Miller
BY
Frease, Bishop, Johns & Schick
ATTORNEYS Sept. 24, 1963 W. E. MILLER 3,104,847
FILM SUPPLY MAGAZINE
Filed Feb. 23, 1962 3 Sheets-Sheet 3
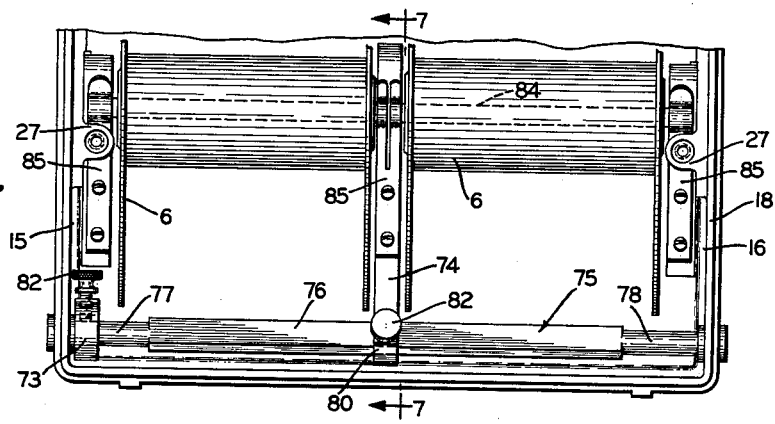
Fig. 6
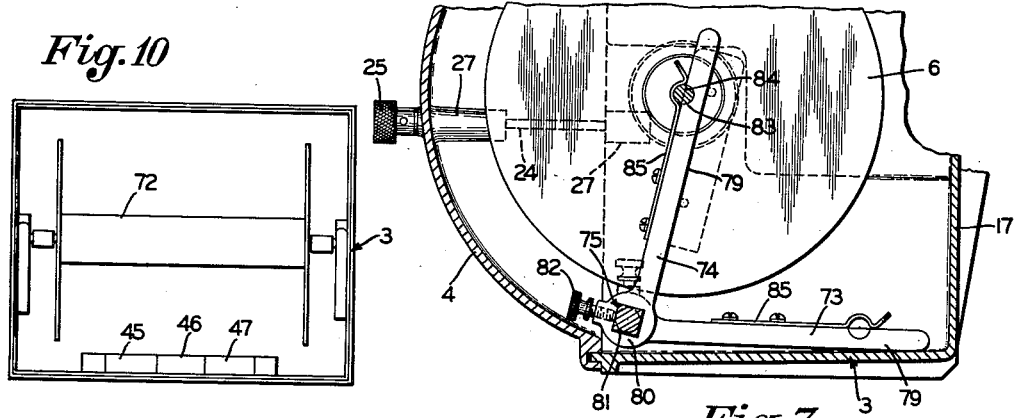
Fig. 10
Fig. 7
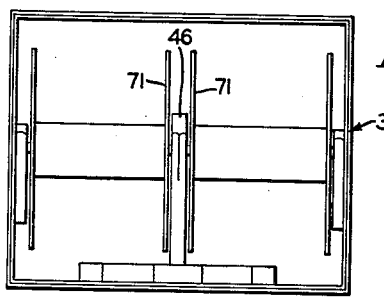
Fig. 11
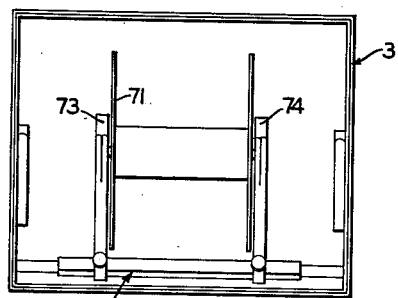
Fig. 13
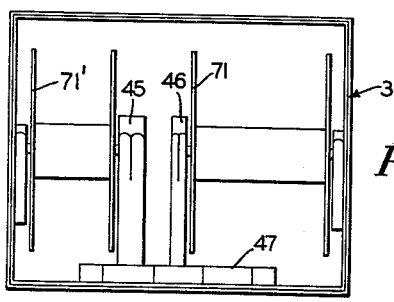
Fig. 12
INVENTOR.
William E. Miller
BY
Frease, Bishop, Johns & Schick
ATTORNEYS

United States Patent Office 3,104,847
Patented Sept. 24, 1963

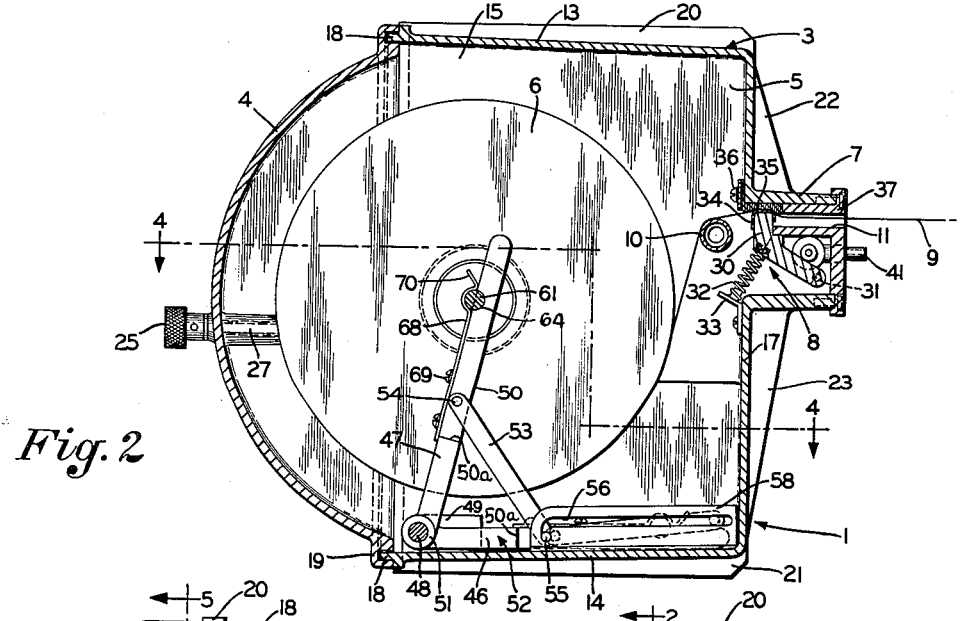

3,104,847
FILM SUPPLY MAGAZINE
William E. Miller, Salem, Ohio, assignor to Miller-Holzwarth, Inc., Salem, Ohio, a corporation of Ohio
Filed Feb. 23, 1962, Ser. No. 175,141
6 Claims. (Cl. 242—71.7)

This invention relates to a film supply magazine and more particularly it pertains to a magazine for supplying film to a processing device such as a film developer.

When developing film in an automatic developer it is frequently convenient to process film of one width and thereafter develop film of another width. In the past it has been the practice to supply film of different widths in separate film supply magazines adapted to hold spools of film of a given width, or use the wider magazine when processing a roll of lesser width film. Each magazine is provided with means for loading and unloading film spools, film outlet means which is provided with a light trap and mounting means for individual spools.

Each film supply magazine heretofore has been adapted to hold only a single spool of a given width, or two spools of a lesser width on a common spindle, making it impossible to insert the second spool after the processing has started. As a result, the convenience of processing a film expeditiously has been minimized by the necessity of maintaining a high inventory of film supply magazines for various widths of film.

It has been found that a film supply magazine may be provided in which a second or third spool may be inserted or removed without interrupting the processing of a first spool of film. The result is an increase in the efficiency of the processing and development of film of different sizes. Where a magazine is loaded with film of different sizes, the film of one size may be immediately processed upon completion of the processing of film of another size without the necessity of changing spools.

Another advantage associated with the provision of film supply magazines adapted for film of different widths is the necessity of maintaining a minimum inventory of film supply magazines. With prior magazines it was necessary to provide at least one magazine for each different size of film, but with a magazine having adaptable means for supporting film spools a lesser number of magazines is usually carried.

The device of the present invention provides a film supply magaine having means adapted to separately mount spools of film of different sizes, it being thereby possible to mount one or more spools as may be desired.

Accordingly, it is a general object of this invention to provide a film supply magazine in which adjustable means are provided for mounting spools of film of one or more sizes as may be convenient, and to provide separate spindles for lesser width film so that the second or third spool may be added during the processing operation.

It is another object of this invention to provide a standard film magazine capable of accepting various width film spools and to have the capability of intermittent insertion of spools when processing the lesser width films.

It is another object of this invention to provide a film supply magazine which provides a versatility of processing with a minimum of handling and changing of magazines.

It is another object of this invention to provide a film supply magazine in which a film having dimensions of 9½", 5" and/or 70 mm. may be mounted either separately or in combination with each other.

Finally, it is an object of this invention to provide an improved film supply magazine in which intermittent spools of film of 5" and 70 mm. widths may be processed in an automatic developer without stopping the processor.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the foregoing general statements, preferred embodiments of which—illustrative of the best modes in which applicant has contemplated applying the principles, are set forth in the following description and shown in the drawings, and which are particularly and distinctly pointed out and set forth in the appended claims forming part hereof.

The nature of the discoveries and improvements of the present invention may be stated in general terms as including a lightproof, boxlike housing having opposite top and bottom walls, opposite side walls, and opposite end walls, one of the side walls being detachably mounted on the housing in a light-tight manner, the other of said side walls having a film-escape slot with light trap means adjustably mounted thereon, means for mounting film spools within the housing including at least two film support arms, the arms being movable between two positions, one of the positions being an upright spool-support position between pairs of film spools, the other of said positions being an out-of-use position spaced from a film spool and film, each arm having means for receiving and holding a film mounting shaft, the arms being rotatably mounted on a shaft parallel to an axis extending between said end walls, each end wall having means for receiving and holding spool mounting shafts, and all of said spool mounting means being aligned when the spool mounting arms are in the upright position.

In the drawings which are illustrative of the preferred embodiments of the invention, by way of example, and in which similar numerals refer to similar parts thereof:

FIGURE 1 is an end view of a film supply magazine mounted on the film entry end of a film processor, shown in section;

FIG. 2 is a vertical sectional view through the film supply magazine taken on the line 2—2 of FIG. 3;

FIG. 3 is an elevational view of one side of the magazine with the cover removed and showing the position and manner of mounting of film spools;

FIG. 4 is a horizontal sectional view taken on the line 4—4 of FIG. 2, with the film spools removed;

FIG. 5 is a vertical sectional view taken on the line 5—5 of FIG. 3;

FIG. 6 is a fragmentary side view of another embodiment of spool mounting means for film spools;

FIG. 7 is a fragmentary vertical sectional view taken on the line 7—7 of FIG. 6;

FIG. 8 is an enlarged fragmentary view showing the manner in which separate spool mounting shafts are mounted in the mounting arm;

FIG. 9 is an enlarged fragmentary sectional view showing the alternate position for the light trap in the film outlet;

FIGS. 10, 11, and 12 are diagrammatic views showing the manner in which spools of different film sizes may be alternately mounted in a film supply magazine of the type shown in FIGS. 1–5; and FIG. 13 is a diagrammatic view showing the manner in which a spool of film may be centrally mounted in the embodiment of the magazine shown in FIGS. 6 and 7.

In FIG. 1 a film supply means is generally indicated at 1 and is detachably mounted on one side 2 of a film processor. The magazine 1 includes a housing 3 and a detachable cover or wall 4 which together provide a magazine chamber 5 in which film spools 6 are mounted. On the side of the housing 3 opposite the cover 4, a film outlet 7 is provided and includes light trap means 8. A strip of film 9 extends from the spool 6 (FIG. 2) over a roll 10 and through a film-escape slot 11 in the outlet 7.

As shown in FIG. 1, when the magazine 1 is mounted in place on the side 2 of the processor, the slot 11 is aligned with an opening 12 in the side.

The housing 3 as well as the cover 4 are preferably composed of a rigid material such as cast aluminum. The housing 3 is composed of a pair of opposite side walls 13 and 14, opposite end walls 15 and 16, and a bottom wall 17. The side opposite the bottom wall 17 is open and is provided with a peripheral flange or tongue 18 which engages a peripheral groove 19 in the cover 4 to provide a light-tight fit when the cover is mounted in place. The side walls 13 and 14 are provided with pairs of spaced guide rails 20 and 21, respectively, and the bottom wall 17 is provided with stiffening ribs 22 and 23 extending from upper and lower sides of the outlet 7.

As shown in FIGS. 2–5, the cover 4 is held detachably in place by a pair of spaced attaching screws 24 having outer knurled surfaces 25 and inner elongated portions 26 which extend through enlarged bored portions 27 of the cover 4 for holding the bolts in alignment. An enlarged portion 27 is disposed on each end wall 15, which portion is provided with a threaded aperture 28 in which an inner threaded portion 29 of each screw 24 is seated.

The slot 11 is substantially coextensive with the length of the bottom wall 17 to accommodate film of varying length. The light trap 8 includes a blade 30 which is pivotally mounted at its lower end by and between a pair of pivot screws 31 (FIG. 1), one extending through each opposite side of the outlet 7. The pivot screws 31 are aligned.

The light trap also includes a compression spring 32, the upper end of which engages an undersurface of the blade 30 and the lower end of which is seated on a bracket 33 secured to the inner side of the wall 17. The spring 32 holds the blade 30 in the closed position as shown in FIG. 2. The upper edge of the blade 30 is provided with an inverted U-shaped cap 34 composed of plastic such as neoprene which in the closed position of the blade presses against the pad 35 in a light-tight manner. The pad 35 is preferably composed of mohair and has an upturned portion on the inner side of the wall 17 which is held in place by spaced screws 36. When film 9 extends through the opening 11, the blade 30 presses the film against the pad 35.

The light trap 8 is also provided with means for depressing the blade 30 to the position shown in FIG. 9. The outlet 7 includes a cover 37 which is secured to the outlet by means of spaced screws 38. The cover 37 includes inturned portions 39 and 40 which form the film opening 11. A plunger 41 (FIG. 2) extends through a corresponding opening in the cover 37 and to a block 42 on which spaced rollers 43 are provided. The rollers 43 rides on the underside of the portion 39 of the cover 37 when the plunger 41 is depressed. The rollers 43 include smaller portions 44 (FIG. 9) which engage the upper surface of the blade 30.

For the purpose of accommodating movement of the rollers 43 and the block 42, an opening 30' is provided in the lever, as shown in FIG. 3. Accordingly, when the magazine 1 is mounted on the processor 2 as shown in FIG. 1, the plunger 41 is depressed by the surface of the processor to the position shown in FIG. 9, permitting free travel of the film 9 from the spool 6 through the opening 11 into the processor. When the magazine 1 is removed from attachment to the processor, the plunger 41 is free to again move to the extended position of FIG. 2 because of the spring 32.

The means for mounting spools of film of different sizes include a plurality of spaced arms or spool supports 45, 46, and 47. The preferred number of arms is three although two or more may be provided as necessary.

As shown in FIGS. 2, 3, and 4, the arms are pivotally mounted on a shaft 48, the ends of which are journalled in blocks 49. Each arm 45, 46, 47 includes an elongated portion 50 having an apertured base 51 which is pivotally mounted on the shaft 48. The width of the base of each arm is substantially equal to one-third of the distance between the spaced blocks 49 (FIG. 3) so that the arms are not movable longitudinally on the shaft 48. However, each arm is pivotally mounted on the shaft 48 and is movable between the upright position of FIG. 2 and a lower, horizontal position 52, as shown in FIGS. 2 and 4 for the arm 46.

In the upright position, each arm is supported in place by a link 53, the upper end of which is pivoted at 54 to an intermediate portion of the arm and the lower end of which is provided with a pin 55 which travels through an L-shaped slot 56 in an upright flange 57 of an angle 58. The base of the angle is secured to the side wall 14 of the housing 3. In addition, the elongated portion 50 of each arm is cut out at 50a to the upper end in order to accommodate the link 53 when the arm is in the lower position as shown in FIG. 4.

The means for mounting the spools 6 within the magazine 1 also include aligned shafts 59, 60, and 61, the number of which equals the number of spools 6. The end shafts 59 and 61 have outer extremities secured in shaft support means on the end walls 15 of the magazine. For that purpose, a mounting block 62 is attached to the end wall and each block is provided with a shaft receiving notch 63, as shown in FIG. 5.

The intermediate shaft 60 as well as the inner ends of the shaft 59 and 61 are mounted in shaft receiving notches 64 in the arms 45, 46, and 47, as shown in FIG. 8. Between the notches 64 in each arm an arm portion 65 is provided between the separate shafts to prevent their undue longitudinal movement.

For each notch 63 a leaf spring 66 is mounted on each block 62 by similar screws 67, which, as shown in FIG. 5, overlaps the notch 63 for holding the shaft 59 or 61 in place. Likewise, similar leaf springs 68 are mounted on the arms 45, 46, and 47 by screws 69 for holding the ends of the shafts 59, 60, and 61 in the notches 64 as shown in FIG. 8. All of the leaf springs 66 and 68 are provided with outturned upper end portions 70 to facilitate manipulation of the springs for removing and inserting the shafts into and out of the notches.

Accordingly, each spool 66 may be separately removed from its position in the magazine as shown in FIG. 3 and replaced by another spool. For example, as shown in diagrammatic views 10, 11, and 12, a spool 6 for 70 mm. film may be mounted on one side of the magazine 1 and a spool 71 for 5" film may be mounted on a shaft between the other side of the magazine and the arm 46, the arm 47 being lowered to the non-use position.

In the alternative, when desirable, two spools 71 for 5" film may be mounted in the magazine 5 on opposite sides of the arm 46, as shown in FIG. 11, or, as shown in FIG. 10, a single large spool 72 for 9" film may be mounted on a single shaft extending between opposite sides of the magazine 1. As was indicated above, the particular size of spool in the magazine 1 at any given time is dependent upon the size of film available for processing at any given time.

The other embodiment of the invention is shown in FIGS. 6, 7, and 13. It is similar to the embodiment of FIGS. 1–5 in all respects except the means for mounting the film. Instead of being provided with arms 45, 46, and 47, the device of FIGS. 6 and 7 is provided with a pair of levers 73 and 74 which may be used either in combination or intermittently of each other. The levers 73 and 74 are movable longitudinally of a shaft 75 on which they are mounted. The shaft 75 extends between opposite sides 15 of the magazine where it is fixed in place.

As shown in FIGS. 7 and 8, the shaft 75 includes an intermediate square portion 76 as well as round end portions 77 and 78. Each lever 73 and 74 includes an elongated portion 79 as well as a base portion 80 which is provided with a square aperture 81 for mounting on the square portion 76 of the shaft 75. When not in use, the levers 73 and 74 are disposed on the round end portions 77 and 78, as shown for the lever 73 in FIG. 6. In the use position, however, the levers 73 and 74 are mounted on the intermediate square portion 76 of the shaft 75 where they are secured in place against lateral movement by a set screw 82. In other respects, levers 73 and 74 resemble the arms 45–47, such as being provided with notches 83 (FIG. 7) for mounting spool mounting shafts 84 in place. The shafts 84 are retained in position by leaf springs 85.

The second embodiment of the invention may be used with various combinations of spools 6, 71, and 72, as shown in FIGS. 10, 11, and 12. In addition, the second embodiment may be used for the mounting of a single spool 71 (FIG. 13) in the center of the magazine 1 between the support levers 73 and 74 where, due to slight variations in the width of a spool of a given size, the spool will not fit into position between the fixed position arms 45, 46, and 47. The spool may be mounted between the longitudinal adjustable levers 73 and 74.

The device of the present invention thus avoids prior art difficulties. It provides means for accommodating film of different sizes in a single film supply magazine and thereby obviates the necessity of providing a separate magazine for each size of film. Accordingly, the inventory of magazines may be substantially reduced for a given operation.

Moreover, by providing adjustable support means for spools of film of different sizes, a single magazine may be mounted in place on a film processor and by the use of dark lights or no light at all, an operator may remove the cover 4 from the magazine for the purpose of replacing or changing the size of film to be processed. In other words, by providing adjustable film support arms, it is no longer necessary to change the magazine mounted on the processor each time a different size of film is to be run through the processor.

In the foregoing description certain terms have been used for brevity, clearness and understanding, but no unnecessary limitations have been implied therefrom as such words are used for descriptive purposes and are intended to be broadly construed.

Moreover, the embodiment of the improved construction illustrated and described herein is by way of example and the scope of the present invention is not limited to the exact construction shown.

Having now described the invention, construction, operation and use of preferred embodiments thereof and the advantageous, new and useful results obtained thereby; the new and useful film supply magazine and reasonable mechanical equivalents thereof obvious to those skilled in the art are set forth in the appended claims.

What is claimed is:

1. A film supply magazine for spools of film of various sizes including
    (a) a lightproof housing having opposite top and bottom walls, side walls, and end walls,
    (b) one of said walls being detachably mounted in a light-tight manner,
    (c) one of said walls having a film-escape slot,
    (d) means for mounting film spools within the housing including at least two spool-support arms positionally mounted between the end walls,
    (e) each arm being adjustable between an upright spool-support position and an out-of-use position,
    (f) each arm having notch means for receiving and holding spool-mounting shafts,
    (g) said end walls having similar notch means for receiving and holding spool-mounting shafts, and
    (h) all of said spool mounting means being aligned when the spool-support arms are in the upright position.

2. The film supply magazine construction of claim 1 in which the spool support arms are pivotally mounted on an axis parallel to an axis extending between said end walls.

3. The film supply magazine construction of claim 1 in which each film support arm in the out-of-use position is spaced from a spool and film mounted in the housing.

4. The film supply magazine of claim 2 in which the film support arms are limited to rotational movement on a shaft between the upright and out-of-use positions.

5. The film supply magazine construction of claim 2 in which the film support arms are movable longitudinally of the shaft and in which set screw means are provided for holding the arm in the desired position on the shaft.

6. The film supply magazine construction of claim 2 in which the shaft on which the film support arms are mounted extends between said opposite end walls of the housing, and in which the shaft is provided with an intermediate portion of non-round cross section and with end portions of round cross section.

References Cited in the file of this patent
UNITED STATES PATENTS

| | | |
|---|---|---|
| 1,671,685 | Scott | May 29, 1928 |
| 1,704,614 | Johnston | Mar. 19, 1929 |
| 2,359,612 | Bolsey | Oct. 3, 1944 |
| 2,711,861 | Heygel et al. | June 28, 1955 |